2 Sheets—Sheet 1.
H. H. KIRK.
DISTILLERY.
No. 74,098. Patented Feb. 4, 1868.
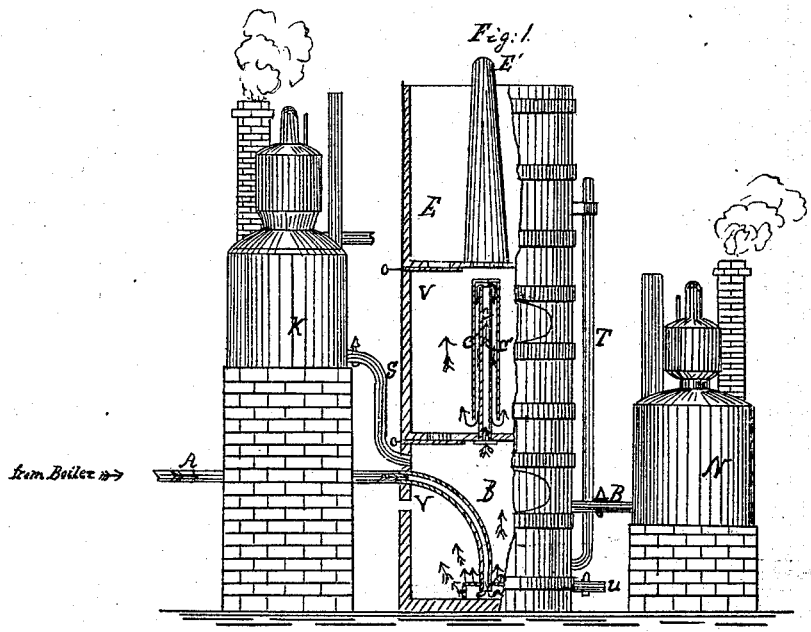
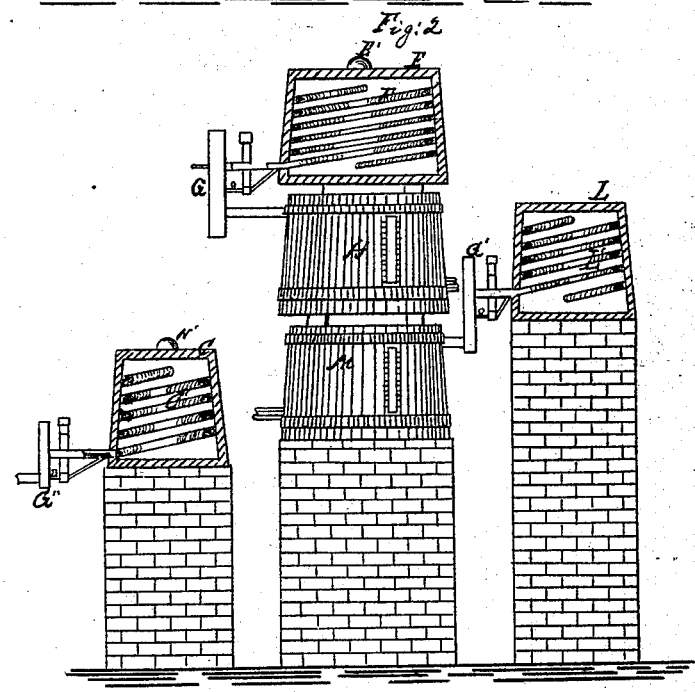
Witnesses—
Inventor.
Henry C Kirk
by
D. C. Holloway & Co his Atty 2 Sheets—Sheet 2.
H. H. KIRK.
DISTILLERY.
No. 74,098. Patented Feb. 4, 1868.
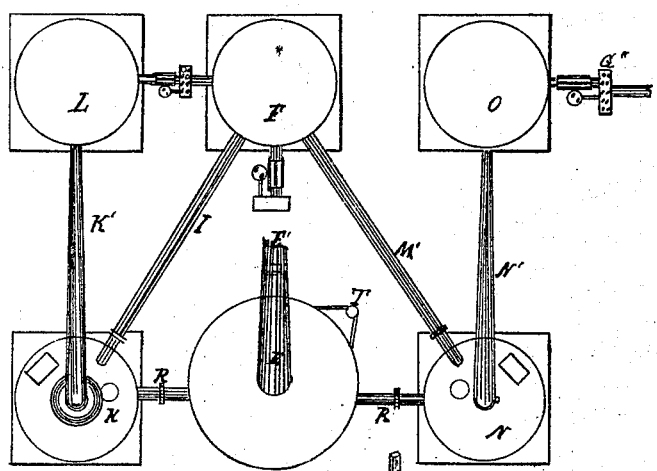
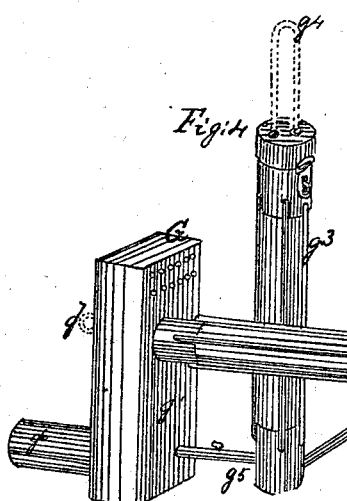
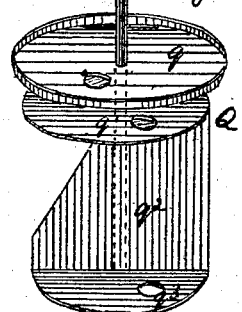
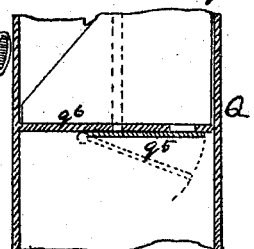
Witnesses—
Inventor.
Henry H. Kirk
by D. O. Holloway & Co
his Attys.

United States Patent Office.

HENRY H. KIRK, OF SPRINGFIELD, TENNESSEE.

Letters Patent No. 74,098, dated February 4, 1868.

IMPROVEMENT IN DISTILLERIES.

The Schedule referred to in these Letters Patent and making part of the same.

TO ALL WHOM IT MAY CONCERN:

Be it known that I, HENRY H. KIRK, of Springfield, in the county of Robertson, and State of Tennessee, have invented a new and useful Improvement in Apparatus for Distillation; and I do hereby declare that the following is a full, clear, and exact description of the same, reference being had to the annexed drawings, in which—

Figure 1 is an elevation partly in section.
Figure 2 is another elevation partly in section.
Figure 3 is a plan.
Figure 4 is a perspective view of the device for enabling the spirit to be tested.
Figure 5 is a perspective view of the coaling-apparatus.
Figure 6 is a vertical section of part of the same.
Figure 7 is a section of one of the tubs and the gauge.

The same letters indicate the same parts in all the figures.

My improvements relate to the arrangement of a distillery for distilling treble copper-distilled whiskey or brandy; and the object is to enable such whiskey to be made in compliance with the requirements of the revenue laws and regulations.

Steam is introduced from the steam-generator through the pipe A into the chamber B, which is filled with the sour beer. The steam, discharged near the bottom, rises through the beer, which, being heated and evaporated, the vapor rises through the pipe C, the lower end of which may be closed by a sliding valve, B'. Over the pipe C is a larger, cup-formed pipe, C', closed above and open below, so that the vapor, rising through the pipe C, descends through the space between the two into the bottom of the chamber D, which is also filled with beer to be heated by the rising steam. Above this is a tub, E, into which the sour mash is first introduced, being passed from one tub to another by means of openings closed by sliding valves operated from outside the tubs. From the tub D the vapor passes through the pipe E' into the flake-stand F, where the first condensation occurs in the worm F'. The spirit flowing from the worm passes through the system of pipes G. The pipe $g$ connects with the worm. This pipe has a glass section inserted, as shown in fig. 4. Thence it passes into the box $g^1$, perforated above with small holes, to permit the escape of the air. When it is desired to test the quality of the spirit, it may be done by means of the pipe $g^2$ leading into the vertical tube $g^3$, also constructed with a glass section, inserted as shown, and which contains the hydrometer and thermometer. When the stop-cock in pipe $g^5$ is closed, the spirit will rise in $g^3$ to the level of that flowing through $g$. When the test is completed the pipe $g^5$ is again opened, and the spirit will flow out of the tube $g^3$. A cap, secured by a lock, is placed on the tube $g^3$, having small holes through it, to permit the passage of a wire, to which a head is attached, for scouring the inside of the glass in the tube $g^3$. A similar contrivance, at F, is intended for scouring the tube $g$, which is for the purpose of enabling the distiller to see the stream of spirit as it flows through the pipe. The spirit then flows into the tub H, which is large enough to hold one charge of the still K, with which it is connected by the pipe I. The stop-cock in this pipe, as well as others used, are made a part of the pipe, and so that they cannot be removed.

The first distillation being completed, a charge is drawn from the tub H into the still K. In order to ascertain how much spirit is contained in the closed chamber, glass gauge-pipes P are attached to them. The still K is heated by a furnace placed under it. In this still the spirit is purified, by boiling it with charcoal. The vapor rising from the still passes through the pipe K' into the flake-stand L, where it is again condensed in the worm L', from which it flows into the tub M, passing through the pipes G', constructed in the same manner as those already described, for the purpose of allowing tests to be made of its present strength. The tub M is constructed like the tub H, for the same purpose. The tub M contains the products of the second distillation. From this tub the liquor is drawn, through the pipe M', into the still N, where it is again boiled, the vapor passing through the pipe N' into the flake-stand O, where it is again condensed in the worm O', from whence it flows through the testing-pipe $g^2$, constructed like those already described, into the cistern-room.

The operation of introducing coal into the still K is accomplished as follows: Q is a copper cylinder placed on the still, open above, into which the coal is poured, falling upon the plate $q$ riveted to the cylinder, and thence falling upon the plate $q^1$ which is attached to the shaft $q^4$, which may be so turned that the coal may pass through holes in the plates $q$ and $q^1$, as shown in fig. 5, into the space on one side of the partition $q^2$. Across the cylinder is a diaphragm, $q^6$, through which there is also a hole, as shown in fig. 6. When the plate $q^3$ is turned so that the hole therein is over the hole in the diaphragm, the charcoal will run through into the still. This arrangement is necessary to supply coal without opening the still. To prevent the spirit being so raised as to flow out, a flap-valve, $q^5$, is placed under the hole in the diaphragm, in such position that it would be closed by the spirit rising to that point. The pipe R leads from the still N, for the purpose of drawing off the low-wines from the still and returning them to the lower chamber, B, of the beer-tub, where it is redistilled. The pipe S is for the same purpose, in connection with the first doubler, K. The coal in the still K is drawn, with the low-wines, into the chamber B, from which it passes off through the pipe U, which is used for drawing off the still-slops remaining in the chamber B, to the slop-troughs. The pipe T is used for the purpose of throwing back the beer from the chamber B to the mash-tub. In the distillation of sour mash, the sour slops from chamber B are used, instead of water, in cooking the meal in the mash-tub. The slops are forced from the chamber B by means of the pressure of the steam after closing the valve $B^1$. Vacuum-valves V are inserted in the sides of the chambers B and D in the usual manner. Floats are placed in the stills, with a stem projecting through the top of the still to indicate the height of spirits in the still.

What I claim as my invention, and desire to secure by Letters Patent, is—

1. The combination of the chambers B H and flake-stand F, first doubler K and second doubler O, with their respective flake-stands and receiving-tubs, all constructed by a series of closed pipes, for the manufacture, by a continuous process, of treble-distilled spirits, substantially in the manner set forth.

2. The arrangement of a pipe, R, for drawing the low-wines from the second doubler N to the chamber B, for redistillation, substantially as described.

3. The arrangement of the pipe S, for drawing the low-wines from the first doubler K to the chamber B for redistillation, substantially as described.

4. The coaling-cylinder Q, constructed with the diaphragms $q$ and $q^6$, in combination with the revolving plates $q^1$ and $q^3$ and partition $q^2$, substantially as and for the purpose set forth.

5. In combination with a coaling-apparatus, substantially as described, I claim the flap-valve $q^5$, as and for the purpose set forth.

6. The arrangement of the testing-pipes G, substantially as described.

In testimony whereof, I have signed my name to this specification in the presence of two subscribing witnesses.

HENRY H. KIRK.

Witnesses:
  JOHN D. BLOOR,
  JOHN S. HOLLINGSHEAD.